Dec. 18, 1962

R. WINKLER ETAL 3,069,025

ROTARY VALVE FOR CONTROLLING APPLICATION OF SUCTION

Filed July 1, 1959

INVENTORS
Richard Winkler and
Kurt Dunnebier
BY Paul E. Mullendore

ATTORNEY

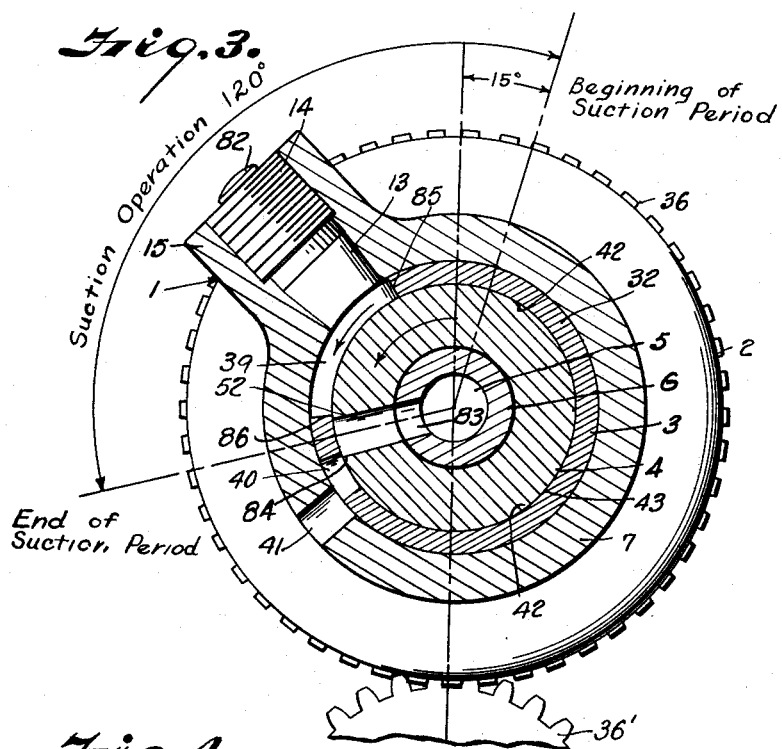
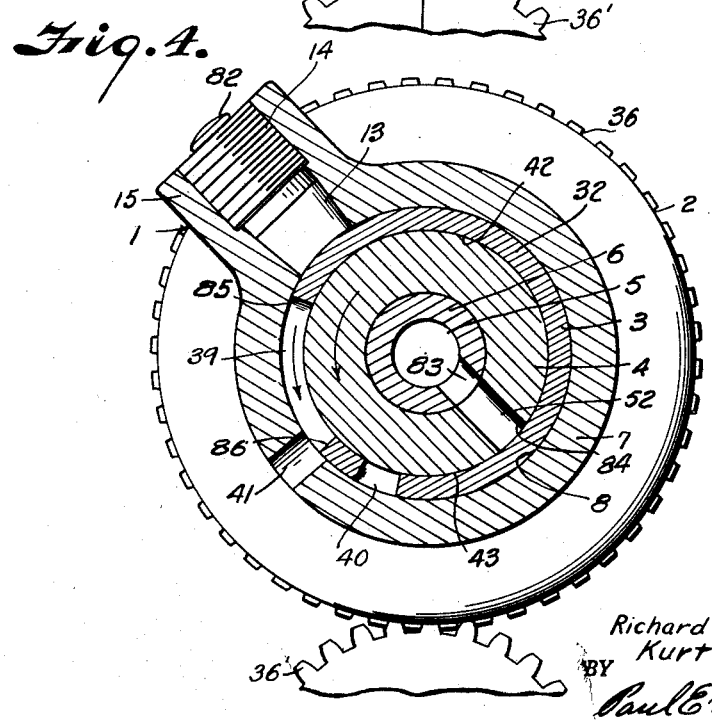

Dec. 18, 1962 R. WINKLER ETAL 3,069,025
ROTARY VALVE FOR CONTROLLING APPLICATION OF SUCTION
Filed July 1, 1959 3 Sheets-Sheet 3

INVENTORS
Richard Winkler and
Kurt Dunnebier
BY

Paul E. Mullendore

ATTORNEY

United States Patent Office 3,069,025
Patented Dec. 18, 1962

3,069,025
ROTARY VALVE FOR CONTROLLING APPLICATION OF SUCTION
Richard Winkler, Rengsdorf, near Neuwied, Rhineland, and Kurt Dunnebier, Wollendorf, near Neuwied, Rhineland, Germany, assignors to Berkley Machine Company, Kansas City, Mo., a corporation of Missouri
Filed July 1, 1959, Ser. No. 824,282
10 Claims. (Cl. 214—1)

This invention relates to a rotary valve for controlling application of suction in suction devices such as used in envelope making machines for feeding, folding, or otherwise handling blanks during formation thereof into envelopes, for example, controlling the suction in the flap folding roller disclosed in our copending application Serial No. 824,279, filed even date herewith.

The principal object of the invention is to provide a rotary valve of this character for controlling suction in cycles involving one or more revolutions of a rotary suction element to take place between suction periods.

Other objects of the invention are to provide a valve of this character with means for controlling duration of the suction period; to provide the valve with means for admission of air to break the suction in timed sequence with the suction period; to provide the valve with effective seals and lubrication between contacting periods; and to provide a valve which is of simple structure and accurate in timing the occurrence of the suction periods.

In accomplishing these and other objects of the invention as hereinafter pointed out, improved structure has been provided, the preferred form of which is illustrated in the accompanying drawings, wherein:

FIG. 3 is a similar cross section showing the relationship of the ports just after the end of a suction period and the beginning of admission of air for breaking the vacuum in the suction device with which the valve may be used.

FIG. 4 is a similar cross section showing a position of the valving elements during which they are moving through the suction cutoff period.

Figure 7:
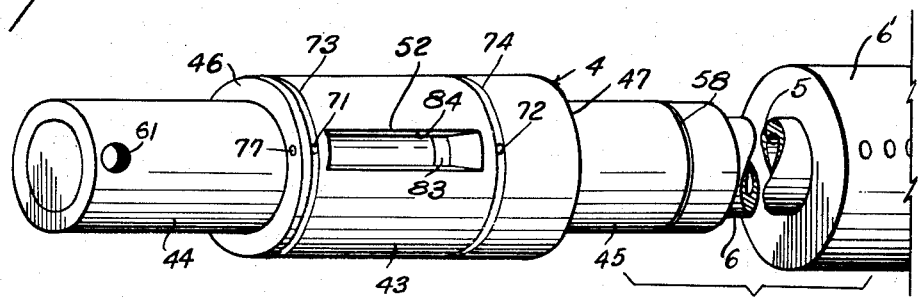
FIG. 7 is a perspective view of the inner valving element and showing connection thereof with the suction device.

Referring more in detail to the drawings:

1 designates a rotary valve constructed in accordance with the present invention, and which includes a suction head in the form of a generally cylindrical casing 2. Rotatably supported in the casing 2 are coaxial valving elements 3 and 4 which are adapted to rotate on a common axis at differential speeds, but in timed relation, to provide an idle period between suction periods to be effected in a suction device 6' illustrated in FIGS. 1 and 7 by way of a bore 5 in a rotating shaft 6 on which the suction device 6' is attached. The suction device 6' may be the suction roller used in folding the closure flaps of envelopes, as disclosed in the above mentioned application, and the shaft 6 may be the rotational support for the roller and by which the roller is rotated in accordance with the working cycle of an envelope making machine.

Figure 1:
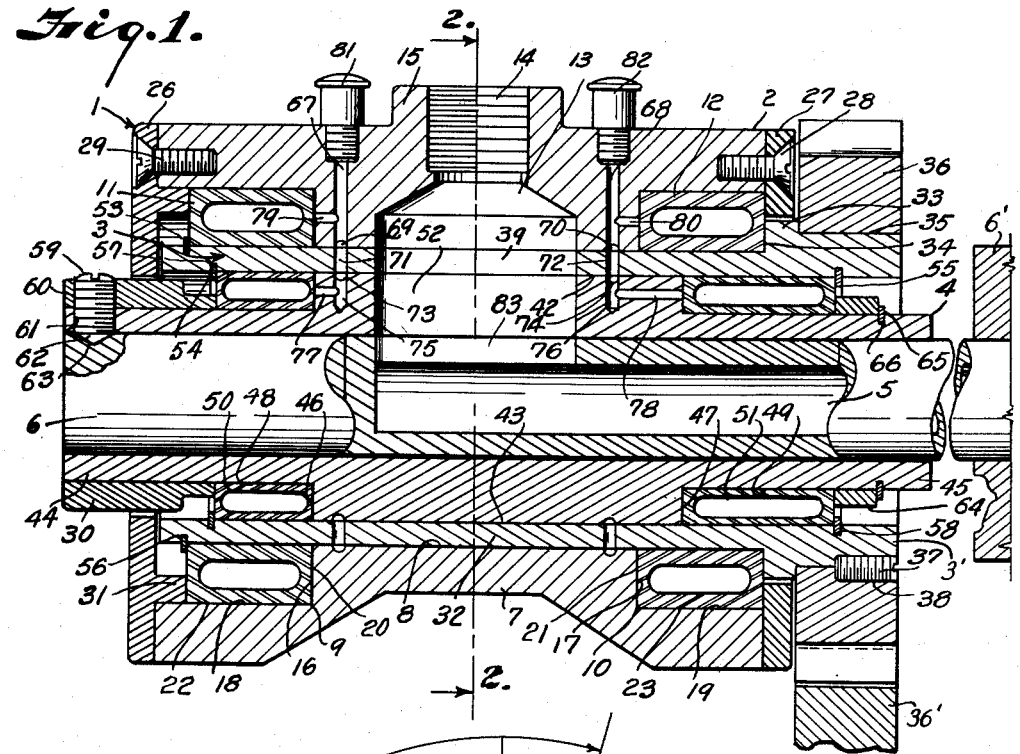
FIG. 1 is a longitudinal section through a rotary valve constructed in accordance with the present invention.

The casing 2 has an annular wall 7 providing an inner annular face 8, and the ends thereof have counterbores 9 and 10 containing combination sealing and bearing rings 11 and 12 to cooperate with the annular face 8 for bearing contact with the outer valving element 3. Formed within the wall 7 of the casing intermediate the counterbores 9 and 10 is a suction port 13 elongated in the direction of the axis of the casing and which connects with an internally threaded bore 14 that extends inwardly through a radially projecting boss 15. The counterbores 9 and 10 provide end sealing faces 16 and 17 and annular faces 18 and 19 to engage corresponding faces 20—21 and 22—23 of the rings 11 and 12. The end faces 20—21 of the rings 11 and 12 are retained in contact with the sealing faces 16 and 17 by end plates 26 and 27 to close the ends of the casing 2 about the ends of the valving elements 3 and 4, as best shown in FIG. 1. The end plate 27 is in the form of a ring secured to the end of the casing 2 by fastening devices such as screws 28, and has an inner diameter to encircle the end 3' of the outer valving element 3. The end plate 26 is likewise secured to the casing 2 by screws 29 and the inner diameter thereof is of a size to encircle freely a stop collar 30 on the end of the inner valving element 4, later to be described. The combination sealing and bearing ring 11 is inset within its bore, but is retained in contact with the sealing face 16 by an annular flange 31 on the end plate 26. The inner circumferential faces of the rings 11 and 12 and the inner sealing face 8 of the casing cooperate to provide rotative contact by the outer valving element 3.

The outer valving element 3 constitutes an elongated sleeve 32 of a length to extend from the inner face of the end plate 26 through the end plate 27 and to project a sufficient distance to accommodate thereon an integral annular flange 33 forming a shoulder 34 to abut the sealing and bearing ring 12. The outer side of the flange 33 cooperates with the projecting end 3' of the sleeve to provide an annular seat 35 for a ring gear 36 for driving the outer valving element 3. The ring gear 36 is secured to its seat by one or more keys 37. In the illustrated instance, the keys 37 comprise screws that are turned into internally threaded openings 38 that are partly formed in the valve element and partly within the inner circumference of the ring gear 36, as shown in FIG. 1. The gear 36 is driven by a gear 36' of smaller diameter and which in turn is rotated at the speed of the suction device 6' to rotate the valving element 3.

Provided in the valving element 3 in registry with the suction port 13 is an arcuate port 39 having a length to cooperate with the inner valving element in providing the desired period that suction is to be effected through the bore 5 of the shaft 6, as later to be described. Also formed in the outer valving element 3 in advance of the port 39 is a smaller port 40 to cooperate with a port 41 in the casing 2 for admitting fresh air to break the suction in the bore 5 of the shaft 6, as later described. The inner face 42 of the outer valving element provides a bearing contact with an outer annular face 43 of a midportion of the inner valving element 4 (FIG. 1).

The inner valving element 4 has reduced end portions 44 and 45 providing annular shoulders 46 and 47 and faces 48 and 49 to seat combination bearing and sealing rings 50 and 51, similar to the combination bearing and sealing rings 11 and 12 previously described. The intermediate portion of the inner valving element has an elongated but relatively narrow port 52 adapted to register at timed intervals with the ports in the outer valving element, as later to be described.

The valving elements are retained in proper endwise relation by split rings 53, 54 and 55, the ring 53 being retained in an annular groove 56 of the outer valving element 4 to engage the outer end of the sealing and bearing ring 11 and cooperate with the flange 33 which engages the other sealing and bearing ring 12. The rings 54 and 55 seat in grooves 57 and 58 that are provided on the inner face of the outer valving element 3 to engage the outer side faces of the combination bearing and sealing rings 50 and 51. The collar 30 abuts against the bearing and sealing ring 50 and is secured to the inner valving element and to the shaft 6 by fastening devices, such as one or more set screws 59, one of which is shown in FIG. 1, the set screws being threadedly engaged in registering openings 60 and 61 in the collar 31 and sleeve 4, respectively, and having conical ends 62 engaging in conical sockets 63 in the periphery of the shaft 6 to turn the sleeve 4 by the shaft 6. Sleeved on the opposite end of the inner valving element is a collar 64 that abuts the outer end face of the bearing and sealing ring 51 and which is retained in contact therewith by a split ring 65 seating in an annular groove 66.

The inner contacting surfaces of the rotating parts are supplied with lubricant through radial channels 67 and 68 in the casing 2 which connect with inner circumferential lubricant distributing grooves 69 and 70 (FIG. 1) and which encircle the outer valving element 3 to distribute lubricant therethrough to radial holes 71 and 72 extending through the outer valving element 3, and which in turn supply lubricant to annular grooves 73 and 74 in the outer circumference of the inner valving element 4, to continue flow of the lubricant to radial channels 75 and 76 which connect with longitudinal channels 77 and 78 (FIG. 1) to supply lubricant to the end faces of the inner combination bearing and sealing rings 50 and 51. Lubricant is also supplied to the ends of the combination sealing and bearing rings 11 and 12 by longitudinal channels 79 and 80 that connect with the radial channels 67 and 68 in the casing 2. The lubricant may be supplied to the radial ports by means of lubricating devices 81 and 82 (FIG. 1) that are carried by the casing 2.

In order to better explain a cycle of operation of the suction control valve of the present invention, it may be assumed that one cycle of operation of a rotary envelope making machine is based upon one revolution of a selected standard roller of the machine. Now, also assuming that the suction device 6' is to make three revolutions per cycle of operation, the valve of the present invention must establish suction in the suction device only upon each third revolution thereof, to provide one suction period per cycle.

It is also assumed that the shaft 6 is the shaft of the suction device 6', and that the inner valving element 4 is mounted thereon with the port 52 thereof in registry with a port 83 in the shaft 6 and which connects with the bore 5 of the shaft. The element 4 is fixed in this position on the shaft by tightening the fastening devices 59. Tightening of the fastening devices 59 also locates the axial position of the suction valve on the shaft 6. Therefore, the port 52 makes three revolutions per cycle, and it is obvious that the outer valving element 3 must be driven at a speed relatively to the inner valving element 4, so that suction is cut off on two revolutions and established during the third revolution. The gear 36 which rotates the outer valving element will be connected through a suitable drive with a rotary gear 36 of the envelope making machine, to give the desired relative rotation of the inner and outer valving elements 3 and 4, which in the present instance is one revolution of the outer valving element 3 to the three revolutions of the inner valving element 4. Also, the ports are related in size to establish suction operation through 120°.

Also assuming that the start of the suction operation is to begin 15° ahead of a vertical plane extending through the rotational axis of the valve (FIG. 1), the port 13 will be fixed in a location where the median length thereof is 45° from said plane in the direction of rotation, in which position a suitable piping (not shown) will connect the source of the vacuum supply (also not shown) with the threaded connection 14 to retain the casing 3 of the valve in stationary position and the port 13 in the desired relation. The timing between the inner and outer valving elements 3 and 4 will be adjusted so that the advance side 84 of the port 52 is substantially registering with the cutoff side 85 of the arcuate port 39 and the opening end 86 of the port 39 is within limits of the port 13.

Figure 2:
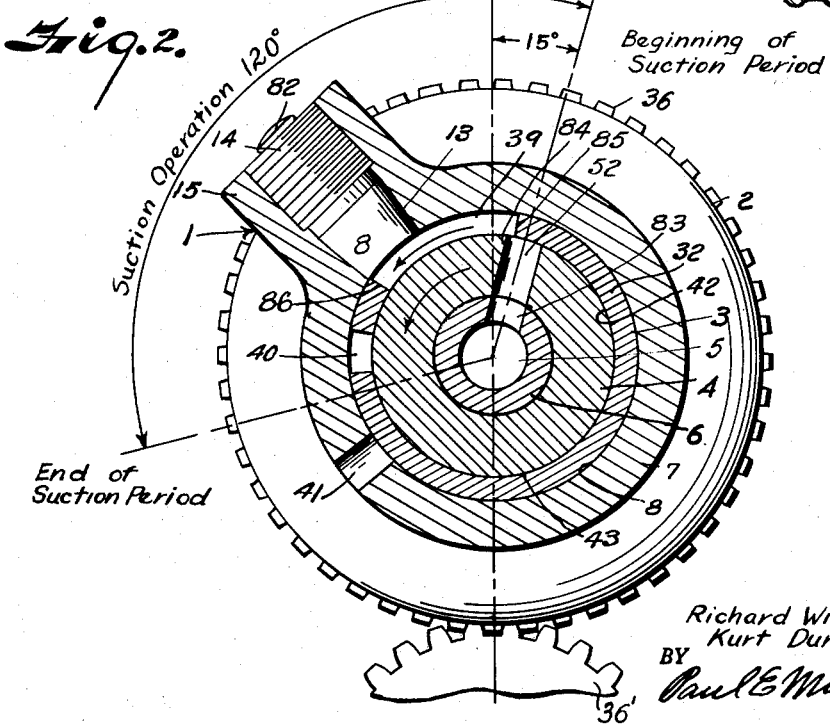
FIG. 2 is a cross section through the valve, taken on the line 2—2 of FIG. 1, particularly illustrating the port relation at the beginning of a suction period.
Figure 5:
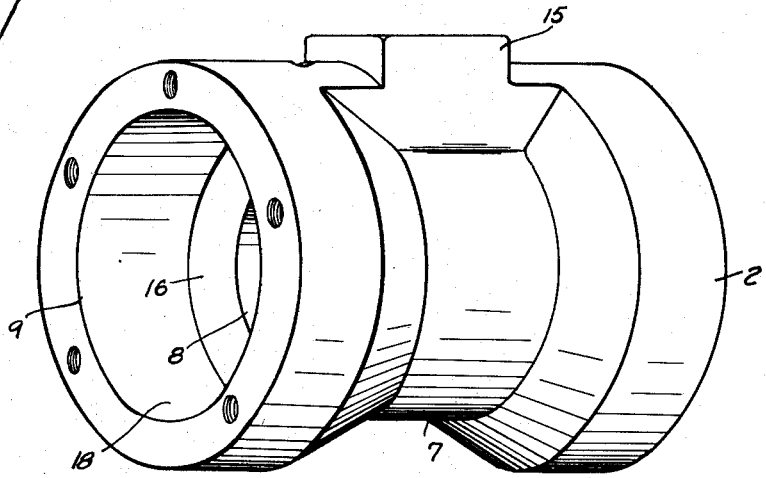
FIG. 5 is a perspective view of the suction head or casing of the valve.
Figure 6:
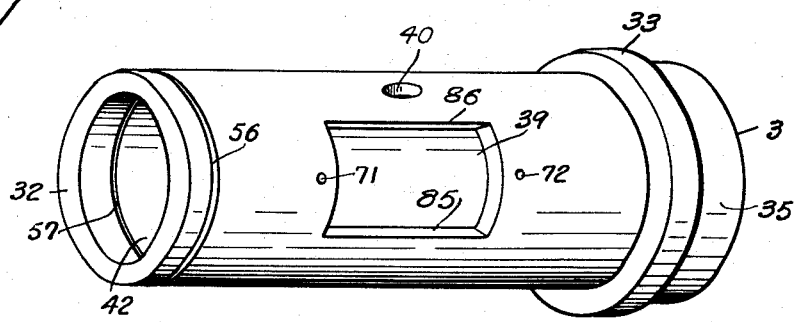
FIG. 6 is a perspective view of the outer valving element.

Now assuming that the machine is started from this position, the port 39 of the outer valving element is advanced across the port 13 at one-third the speed of the advance of the port 52. In other words, the port 52 of the inner valving element 4 advances 30° for each 10° revolution of the controlling port 39 of the outer valving element 3. If the suction track for the suction device 6 is to be 120°, as above stated, the port 52 of the inner valving element 4 is carried through 120° during the suction period and the outer valving element 3 has moved through 40° across the suction port 13, to maintain suction through the ports through the full 120° of rotation of the inner valving element (see FIG. 2).

By observing FIG. 3, it will be noted that the suction is now cut off and that ports 52 and 40 are moving into registry with the vent port 41 of the valve casing to admit atmospheric air through the bore 5 into the suction device of the envelope making machine (not shown). During this time the port 39 is being valved by the portion of the casing between the ports 13 and 41 and by the time the port 39 reaches the port 41, the port 52 has advanced out of registry with the port 41.

At the end of the suction period, the inner valving element will require 240° to make one full revolution, and two additional revolutions, or 960°, to complete one cycle, but since the outer valving element is moving one-third as fast, the outer valving element will have one-third of 960° or 320° to complete its cycle which is the number of degrees from the point of suction cutoff to the start of the next suction period. Therefore, the outer valving element is closing the suction port 13 (see FIG. 4) for the full time that the port 52 and port 39 require to reach the beginning of the next suction cycle.

While we have described a valve constructed to establish a certain suction period and interval between one suction period and the next, it is obvious that the time intervals might be changed to suit the conditions to be encountered.

From the foregoing, it is obvious that we have provided a suction control valve of construction which is well adapted to establish suction periods in desired sequences as may be required in a suction device which may make a plurality of complete revolutions between suction periods.

What we claim and desire to secure by Letters Patent is:

1. A valve for controlling suction to a suction device, including a valve casing having a port adapted to be connected with a source of suction, a rotatable valving element rotatable within the casing and having a port adapted to register with the port in the casing, a rotatable control element having a port adapted to register with the port in the rotatable valving element, and means for continuously rotating the said valving and control elements at different speeds with the control element operating at a slower speed than the valving element for establishing a period of suction to the suction device during a part of a revolution of the valving element alternating with revolutions of said valving element when the valving and control elements are cooperating to shut off the port in the valve casing from connection with the port in the valving element.

2. A valve as described in claim 1, wherein the control element and casing have vent ports adapted to register with the port of the valving element following the suction period for admitting atmospheric pressure to the suction port for relieving suction in the valving element.

3. A valve of the character described, including a generally cylindrical valve casing having a port adapted to be connected with a source of suction, a generally cylindrical valving element rotatable coaxially within the casing, a sleeve element rotatable in the casing over the valving element and having a port for connecting the port of the casing with the port of the valving element during a part of one revolution of the valving element to draw suction through the valving element, and said sleeve element having portions for closing said ports during other revolutions of the valving element, and means for continuously rotating the valving and sleeve elements at different speeds.

4. A valve as described in claim 3, wherein the casing and control elements have vent ports spaced from the ports in the casing and control elements in the direction of rotation for supplying atmospheric pressure to the part of the valving element subsequently to said part of one revolution for relieving suction in the valving element.

5. In combination with a rotary suction device, an apparatus for establishing suction to the rotary suction device at regular periods with the suction periods occurring during certain revolutions of the suction device and for suspending the suction during the intermediate revolutions, said apparatus including a rotary valving element in continuous rotation with the suction device and having a suction port in connection with said suction device, a valve casing enclosing the rotary valving element and having a port adapted to be connected with a source of suction, a suction control element rotatable within the valve casing and in valving contact with the valving element, said suction control element having a port for connecting the port of the casing with the port of the valving element during certain revolutions of the valving element and having a portion for closing said ports during the intermediate revolutions of the valving element, and means for rotating the control element at a differential speed relatively to the suction device.

6. In combination, a rotary suction device, an apparatus for establishing suction to the rotary suction device at regular periods with the suction periods occurring during certain revolutions of the suction device and for suspending the suction during the intermediate revolutions of the suction device, said apparatus including a generally cylindrical valving element rotatable with the suction device and having a suction port in connection therewith, a generally cylindrical valve casing enclosing the valving element and having a port adapted to be connected with a source of suction, a sleeve element rotatable in the valve casing around the valving element and having a port for connecting the port of the casing with the port of the valving element during certain revolutions of the valving element and having a portion for closing said ports during the intermediate revolutions of the valving element, and means for rotating the sleeve element at a differential speed relatively to the suction device.

7. In combination, a rotary suction device, an apparatus for establishing suction to the rotary suction device at regular periods with the suction periods occurring during certain revolutions of the suction device and for suspending the suction during the intermediate revolutions thereof, said apparatus including a rotary valving element in continuous rotation with the suction device and having a suction port in connection therewith, a valve casing enclosing the rotary valving element and having a port adapted to be connected with a source of suction, a sleeve element rotatable within the valve casing and around said valving element and having a port for connecting the port of the casing with the port of the rotary valving element during a part of one revolution of the valving element and having a portion for closing said ports during the intermediate revolutions of the valving element, said casing and the sleeve element having vent ports adapted to register with each other and with the suction port in the sleeve element for admitting air to the suction device, and means for rotating the sleeve element at a differential speed relatively to the suction device.

8. In combination, a rotary suction device, an apparatus for establishing suction to the rotary suction device at regular periods with a suction period occurring with each third revolution of the suction device and for suspending the suction during the intermediate revolutions thereof, said apparatus including a rotary valving element in continuous rotation with the suction device and having a suction port in connection with said suction device, a valve casing enclosing the valving element and having a port adapted to be connected with a source of suction, a sleeve element rotatable within the valve casing and coaxially of the valving element, said sleeve element having an arcuate port of a length to connect with the port of the casing while the port in the sleeve element is in connection therewith through substantially 120° of rotation of the sleeve element, said sleeve element having a portion for closing said ports in the casing and valving element during the intermediate revolutions of the valving element, and means for rotating the sleeve element at substantially one-third the speed of the suction device.

9. In combination, a rotary suction device, an apparatus for establishing suction to the rotary suction device at regular suction periods with a suction period occurring during each third revolution of the suction device and for suspending the suction during the intermediate revolutions thereof, said apparatus including a rotary valving element in connection with the suction device and having a suction port in connection with said suction device, a valve casing enclosing the rotary valving element and having a port adapted to be connected with a source of suction, a sleeve element rotatable in the valve casing coaxially around the valving element and having an arcuate port of a length to connect with the port of the casing while the port in the sleeve element is in connection therewith through substantially 120° of rotation of the sleeve element, said sleeve element having a portion for closing said ports during the intermediate revolutions of the valving element, means for rotating the suction element together with the valving element, and means for rotating the sleeve element at substantially one-third the speed of the suction device and valving element, said casing and sleeve element having vent ports with which the port of the valving element is adapted to register following said suction period for admitting air to the suction device for breaking vacuum within the suction device.

10. In combination with a rotary suction device, a rotary control valve for establishing suction through the suction device for a period of time during a revolution in a cycle of revolutions of the suction device, said control valve including a casing having an air inlet port and a suction port for connection with a source of suction, inner and outer valving members rotatable within the casing, said outer member having a suction port and an air port, said inner member having a suction port and a connection from said suction port to the rotary suction device, means for rotating the inner member at the speed of the rotary suction device, and means for rotating the outer member at a slower speed than the inner member for establishing the suction for a period of time when the suction ports are in registry during said one revolution of the suction device and for suspending action during other revolutions of the cycle when the suction ports are out of registry, and said air ports being related to the suction port of the inner member to admit air to the rotary suction device at the end of the suction period.

References Cited in the file of this patent

UNITED STATES PATENTS

| | | |
|---|---|---|
| 1,698,400 | Guest | Jan. 8, 1929 |
| 1,888,194 | Broadmeyer | Nov. 15, 1932 |
| 1,992,104 | Theodorides | Feb. 19, 1935 |
| 2,491,429 | Thomas | Dec. 13, 1949 |
| 2,804,974 | Noon | Sept. 3, 1957 |